United States Patent
Asakura (10) Patent No.: US 9,384,768 B1
(45) Date of Patent: Jul. 5, 2016

(54) MAGNETIC DISK DEVICE AND DETERMINING METHOD OF CROSSING A ZONE BOUNDARY

(71) Applicant: Kabushiki Kaisha Toshiba, Minato-ku, Tokyo (JP)

(72) Inventor: Makoto Asakura, Bunkyo Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/639,008

(22) Filed: Mar. 4, 2015

Related U.S. Application Data (60) Provisional application No. 62/094,444, filed on Dec. 19, 2014.

(51) Int. Cl.
*G11B 5/596* (2006.01)
*G11B 5/55* (2006.01)
*G11B 20/10* (2006.01)

(52) U.S. Cl.
CPC .......... *G11B 5/59627* (2013.01); *G11B 5/5526* (2013.01); *G11B 5/5547* (2013.01); *G11B 5/59616* (2013.01); *G11B 20/10037* (2013.01); *G11B 20/10222* (2013.01)

(58) Field of Classification Search
CPC .............. G11B 5/5547; G11B 5/5526; G11B 5/59616; G11B 20/10222; G11B 2020/1232; G11B 20/10037; G11B 7/0941; G11B 21/083; G11B 7/095; G11B 20/1403; G11B 5/59655; G11B 5/59627; G11B 5/59666

USPC ........ 369/44.32; 360/51, 49, 75, 78.09, 77.07
See application file for complete search history.

(56) References Cited

U.S. PATENT DOCUMENTS

| | | | | |
|---|---|---|---|---|
| 6,870,801 | B2 * | 3/2005 | Ikai | G11B 7/0941 369/44.32 |
| 7,929,238 | B1 | 4/2011 | Vasquez | |
| 8,724,245 | B1 | 5/2014 | Smith et al. | |
| 8,817,416 | B2 * | 8/2014 | Iwashiro | G11B 5/5547 360/78.09 |
| 8,885,278 | B2 * | 11/2014 | Asakura | G11B 5/5547 360/48 |
| 2014/0198407 | A1 | 7/2014 | Iwashiro et al. | |

FOREIGN PATENT DOCUMENTS

JP         05-094674 A        4/1993

* cited by examiner

*Primary Examiner* — Ali Neyzari
(74) *Attorney, Agent, or Firm* — White & Case LLP (57) ABSTRACT

According to one embodiment, a magnetic disk device includes a magnetic disk in which servo patterns with different writing frequencies are recorded and divided into a plurality of zones in a cross-track direction; a magnetic head that is provided for the magnetic disk; and a controller to determine whether the magnetic head cross a zone boundary between the zones of the servo patterns, according to a predicted position of the magnetic head that is corrected with reference to a phase shift time between the zones of the servo patterns.

18 Claims, 9 Drawing Sheets

MAGNETIC DISK DEVICE AND DETERMINING METHOD OF CROSSING A ZONE BOUNDARY

CROSS-REFERENCE TO RELATED APPLICATIONS

This application is based upon and claims the benefit of priority from U.S. Provisional Application No. 62/094,444, filed on Dec. 19, 2014; the entire contents of which are incorporated herein by reference.

FIELD

Embodiments described herein relate generally to a magnetic disk device and a determining method of crossing a zone boundary.

BACKGROUND

In order to increase data areas for writing user data in a magnetic disk device, a method has been employed by which to divide a servo pattern into a plurality of zones from inner periphery to outer periphery of a magnetic disk and set frequency for writing the servo pattern (reference frequency) in zone on the outer peripheral side to be higher than that in zone on the inner peripheral side (zone servo technique). According to zone servo technique, void regions of specific width with no user data written are provided in the vicinities of zone boundaries so that the servo pattern can be surely switched between the zones.

DETAILED DESCRIPTION

In general, according to one embodiment, the magnetic disk device includes a magnetic disk in which servo patterns with different writing frequencies are recorded and divided into a plurality of zones in a cross-track direction; a magnetic head that is provided for the magnetic disk; and a controller to determine whether the magnetic head cross a zone boundary between the zones of the servo patterns, according to a predicted position of the magnetic head that is corrected with reference to a phase shift time between the zones of the servo patterns.

Exemplary embodiments of a magnetic disk device and a method will be explained below in detail with reference to the accompanying drawings. The present invention is not limited to the following embodiments.

First Embodiment

Figure 1:
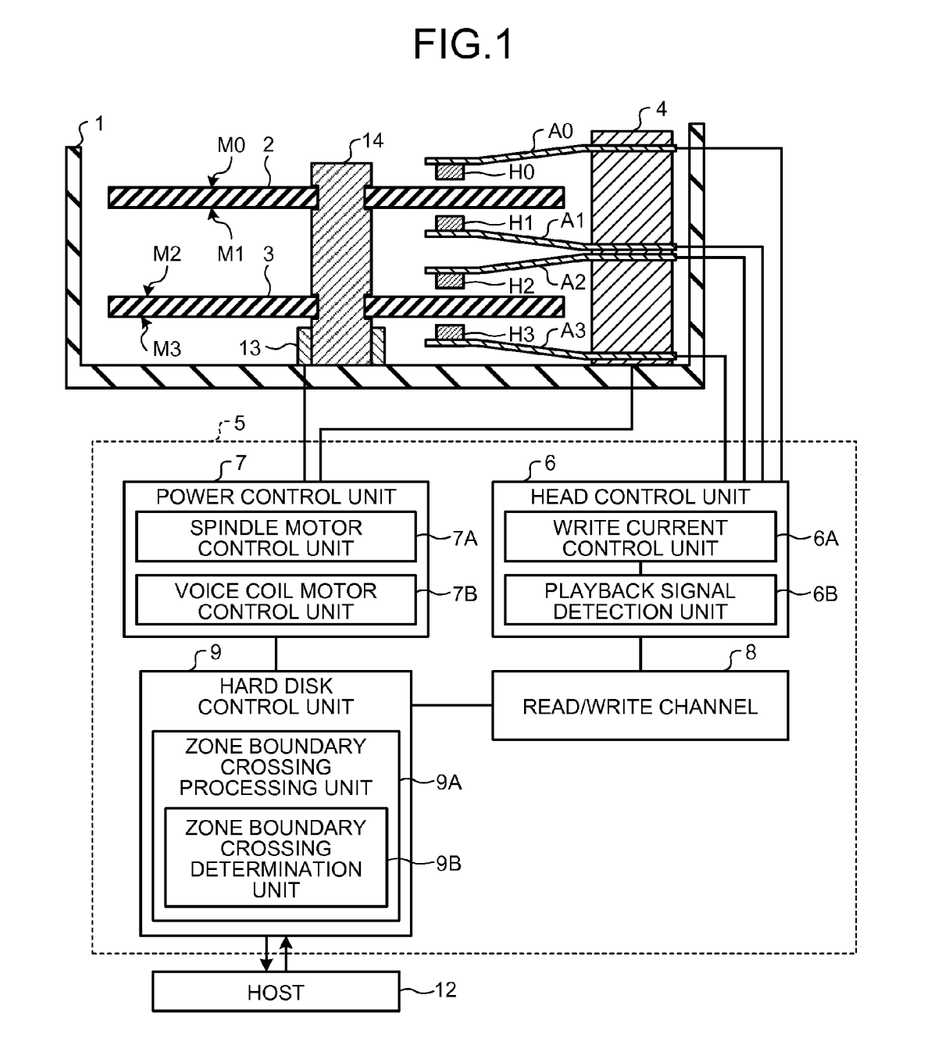
FIG. 1 is a schematic block diagram of a magnetic disk device according to a first embodiment.

FIG. 1 is a schematic block diagram of a magnetic disk device according to a first embodiment.

Referring to FIG. 1, the magnetic disk device includes a plurality of magnetic disks 2 and 3. The magnetic disk 2 has disk surfaces M0 and M1 on sides thereof. The magnetic disk 3 has disk surfaces M2 and M3 on sides thereof. The magnetic disks 2 and 3 are integrally supported via a spindle 14.

The magnetic disk device also includes magnetic heads H0 to H3 for the disk surfaces M0 to M3, respectively. The magnetic heads H0 to H3 are opposed to the disk surfaces M0 to M3, respectively. The magnetic heads H0 to H3 may have separate read heads and write heads. The magnetic heads H0 to H3 are held over the disk surfaces M0 to M3 via arms A0 to A3, respectively. The arms A0 to A3 can slide the magnetic heads H0 to H3 in horizontal planes, respectively.

Figure 2A:
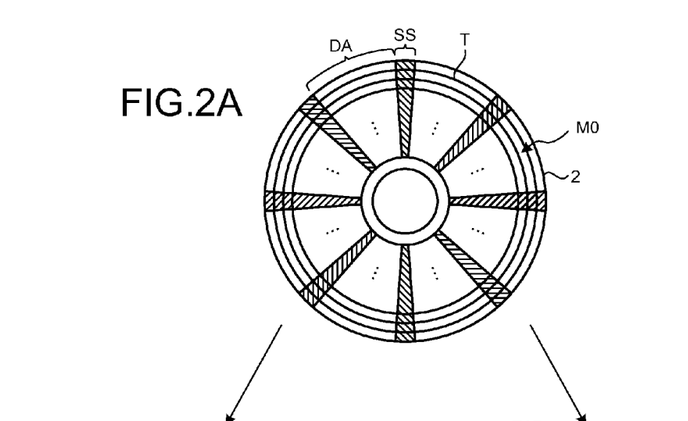
FIG. 2A is a plane view of a track layout in a magnetic disk illustrated in FIG. 1.
Figure 2B:
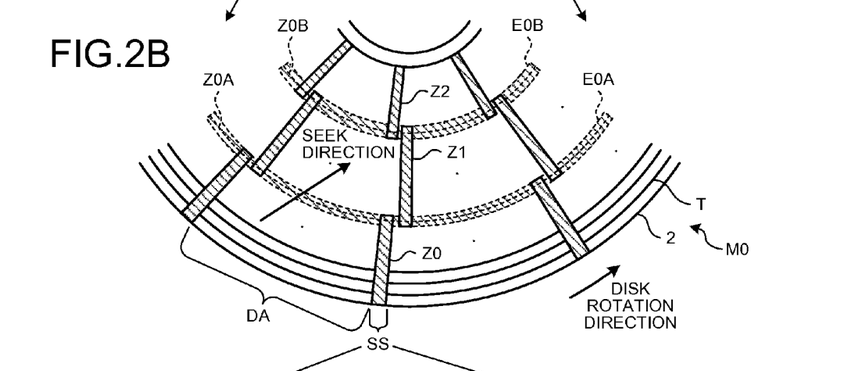
FIG. 2B is a diagram illustrating a technique of zone dividing in servo areas.
Figure 2C:
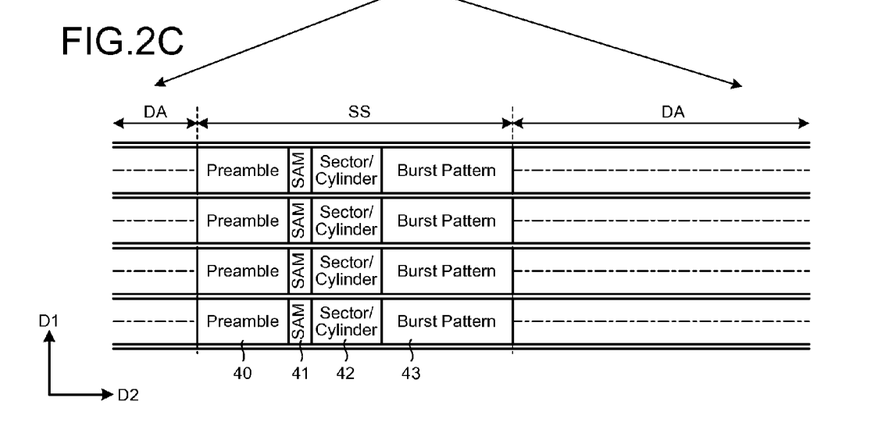
FIG. 2C is a diagram of a configuration example of the servo areas illustrated in FIG. 2B.

As illustrated in FIGS. 2A to 2C, the disk surface M0 includes tracks T along a down-track direction D2, for example. Each of the tracks T has data areas DA into which user data is to be written and servo areas SS in which servo data is written. In this example, the servo areas SS are radially arranged, and the data areas DA are arranged between the servo areas SS along the down-track direction D2.

The servo areas SS are divided into zones Z0 to Z2 in a cross-track direction D1, and the zones Z0 to Z2 are shifted from each other in the down-track direction D2, as illustrated in FIG. 2B. In this example, the zones Z0 and Z1 overlap each other at their ends with a gap therebetween, and the zones Z1 and Z2 overlap each other at their ends with a gap therebetween. By providing overlapping section between the zones Z0 and Z1 and overlapping section between the zones Z1 and Z2, it is possible to prevent that, after switching among the zones Z0 to Z2, the switched zones Z0 to Z2 cannot be detected, even though there is any error in timing for switching among the zones Z0 to Z2. This allows execution of a normal servo process.

A zone boundary Z0A is provided in the vicinity of the track overlapping the zones Z0 and Z1, and a zone boundary Z0B is provided in the vicinity of the track overlapping the zones Z1 and Z2. In addition, a void region E0A is provided along the zone boundary Z0A, and a void region E0B is provided along the zone boundary Z0B. The void regions E0A and E0B are not accessible as data areas DA. Accordingly, the void regions E0A and E0B put pressure on the effective data capacity per disk surface. Width of the void region E0A may correspond to width of the overlapping section between the zones Z0 and Z1. Width of the void region E0B may correspond to width of the overlapping section between the zones Z1 and Z2. In the example of FIG. 2B, the servo areas SS are divided into the three zones Z0 to Z2 as described above. Alternatively, the servo areas SS may be divided into an arbitrary number of zones that are two or more. The zones Z0 to Z2 may be configured with different writing frequencies in the servo areas SS (hereinafter, referred to as zone servo method). In the example of FIG. 2B, the writing frequency as a reference frequency of a servo pattern in the zone Z0 on the outer peripheral side can be higher than that in the zone Z2 on the inner peripheral side. For example, the writing frequency in the zone Z0 may be set to 200 MHz, the writing frequency in the zone Z1 may be set to 150 MHz, and the writing frequency in the zone Z2 may be set to 100 MHz. In this example, by setting the writing frequency on the outer peripheral side to be higher than that on the inner peripheral side, it is possible to reduce the spaces of the zones Z0 and Z1 and thus increase the data area DA, as compared to the case where the writing frequencies in the zones Z0 to Z2 are set to be the same. The servo areas SS are also divided into the zones Z0 to Z2 for data recording on the disk surfaces M1 to M3 as well as the disk surface M0.

As illustrated in FIG. 2C, written in the servo areas SS are preambles 40, servo area marks 41, sector/cylinder information (gray codes) 42, and burst patterns 43. The sector/cylinder information 42 provides servo addresses on the disk surface M0 in the down-track direction D2 and the cross-track direction D1, which can be used for seek control to move the magnetic head H0 to a target track. The burst patterns 43 can be used for tracking control to position the magnetic head H0 within the target track. The burst patterns 43 may be null-type burst patterns, area-type burst patterns, or phase difference-type patterns.

As illustrated in FIG. 1, the magnetic disk device also includes a voice coil motor 4 that drives the arms A0 to A3, and a spindle motor 13 that rotates the magnetic disks 2 and 3 via the spindle 14. In addition, the magnetic disks 2 and 3, the magnetic heads H0 to H3, the arms A0 to A3, the voice coil motor (also called VCM) 4, the spindle motor 13, and the spindle 14 are stored in a case 1.

The magnetic disk device includes a magnetic recording control unit 5. The magnetic recording control unit 5 has a head control unit 6, a power control unit 7, a read/write channel 8, and a hard disk control unit 9. The head control unit 6 has a write current control unit 6A and a playback signal detection unit 6B. The power control unit 7 has a spindle motor control unit 7A and a voice coil motor control unit 7B. The hard disk control unit 9 has a zone boundary crossing processing unit 9A. For example, when determining that the magnetic head H0 will cross the zone boundaries Z0A and Z0B, the zone boundary crossing processing unit 9A can make a servo frequency change request, a servo gate generation timing change request, and the like. The process at the zone boundary crossing processing unit 9A can be realized by firmware executed at the CPU. The zone boundary crossing processing unit 9A includes a zone boundary crossing determination unit (hereinafter, referred to as crossing determination unit) 9B. The crossing determination unit 9B determines whether the magnetic head H0 will cross the zone boundaries Z0A and Z0B, according to the predicted position of the magnetic head H0 that is corrected based on phase shift times in the servo areas SS among the zones Z0 to Z2, for example. At that time, the crossing determination unit 9B can correct the predicted position of the magnetic head H0 in such a manner that any of the zones Z0 to Z2 can be detected immediately after the magnetic head H0 has cross any of the zones Z0A and Z0B, for example. The hard disk control unit 9 may include a general-purpose processor that performs recording/playback control and a dedicated processor that exchanges data with a host 12 and the read/write channel 8.

The head control unit 6 amplifies signals at the time of recording/playback. The write current control unit 6A controls write current flowing into the magnetic heads H0 to H3.

The playback signal detection unit 6B detects signals read by the magnetic heads H0 to H3. The power control unit 7 drives the voice coil motor 4 and the spindle motor 13. The spindle motor control unit 7A controls rotation of the spindle motor 13. The voice coil motor control unit 7B can control drive of the voice coil motor 4. The read/write channel 8 converts signals played back at the magnetic heads H0 to H3 into a data format capable of being handled by the host 12 or converts data output from the host 12 into a signal format capable of being recorded at the magnetic heads H0 to H3. Such format conversion includes DA conversion and encoding. The read/write channel 8 performs a decoding process on the signals played back at the magnetic heads H0 to H3 or performs code modulation on the data output from the host 12. The hard disk control unit 9 performs recording/playback control under instructions from the host 12 or exchanges data with the host 12 and the read/write channel 8.

The magnetic recording control unit 5 is connected to the host 12. The host 12 may be a personal computer that provides a write instruction or a read instruction to the magnetic disk device or may be an external interface.

While the magnetic disks 2 and 3 are rotated by the spindle motor 13, the magnetic heads H0 to H3 read signals from the disk surfaces M0 to M3, respectively, and the playback signal detection unit 6B detects the signals. The signals detected by the playback signal detection unit 6B are data-converted at the read/write channel 8 and are sent to the hard disk control unit 9. Then, the hard disk control unit 9 performs tracking control on the magnetic heads H0 to H3 according to the burst patterns 43 included in the signals detected by the playback signal detection unit 6B.

In addition, the hard disk control unit 9 calculates the current positions of the magnetic heads H0 to H3 according to the sector/cylinder information 42 included in the signals detected by the playback signal detection unit 6B, and performs seek control on the magnetic heads H0 to H3 in such a manner that the magnetic heads H0 to H3 come close to target positions. For example, when the seek control is performed on the magnetic head H0, the crossing determination unit 9B determines whether the magnetic head H0 will cross the zones boundaries Z0A and Z0B. On the crossing determination, the future position of the magnetic head H0 is predicted. The future predicted position may be a predicted position one sample after or a predicted position two samples after. The predicted position is then corrected with reference to phase shift times among the zones Z0 to Z2, and it is determined whether the corrected position will cross the zone boundaries Z0A to Z0B. To prevent any false determination to be made despite the absence of crossing the zone boundaries Z0A to Z0B, only the predicted position with the presence of crossing the zone boundaries Z0A to Z0B can be corrected according to phase shift times in the servo areas SS among the zones Z0 to Z2.

Then, when it is determined that the magnetic head H0 will cross the zone boundaries Z0A to Z0B according to the corrected predicted position, the servo frequency and the servo gate generation timing are changed corresponding to the zones Z0 to Z2 after the crossing there.

In this example, even when there is an error in fluctuations of time at which the magnetic head H0 passes through the zones Z0 to Z2 resulting from the phase shifts among the zones Z0 to Z2, the error can be removed by correcting the predicted position with reference to the phase shift times among the zones Z0 to Z2. Accordingly, even when there are phase shifts among the zones Z0 to Z2, the error in timing for switching among the zones Z0 to Z2 can be reduced. Therefore, it is possible to decrease the widths of the void regions E0A and E0B and increase the effective data capacity per disk surface.

Figure 3:
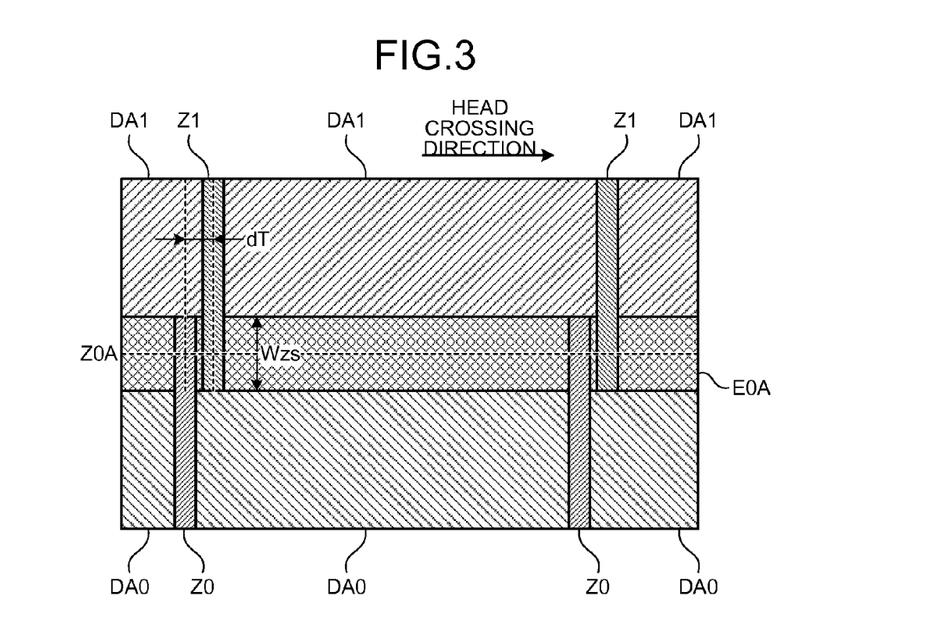
FIG. 3 is an enlarged view of a void region illustrated in FIG. 2B.

FIG. 3 is an enlarged view of a void region illustrated in FIG. 2B.

Referring to FIG. 3, the data area DA includes a data area DA0 that is read/written according to the servo data in the zone Z0, and a data area DA1 that is read/written according to the servo data in the zone Z1. During crossing of the head, there is a phase shift time dT between the zones Z0 and Z1. A void region E0A is provided between the data areas DA0 and DA1.

At that time, when the width of the void region is designated as Wzs, the maximum velocity of the magnetic head H0 at seek time as maxVel, and the phase shift time between the zones Z0 and Z1 as dT, Wzs satisfies the condition in equation (1) as follows:

$$Wzs < \text{maxVel} \times dT \qquad (1)$$

where the value of maxVel×dT corresponds to a position error resulting from the phase shift between the zones Z0 and Z1. The crossing determination unit 9B illustrated in FIG. 1 can remove the position error resulting from the phase shift between the zones Z0 and Z1 when determining whether the magnetic head H0 will cross the zone boundary Z0A. Accordingly, it is possible to detect normally the servo data even when Wzs is set in such a manner as to satisfy the condition Wzs<maxVel×dT.

When an MR offset at the current radius position is designated as MRf, the MR offset may be set to satisfy the condition MRf<Wzs<maxVel×dT. The MR offset is determined by the length of a separation gap between the read head and the write head of the magnetic head H0 and the angle of a skew relative to the track at the current radius position.

Figure 4:
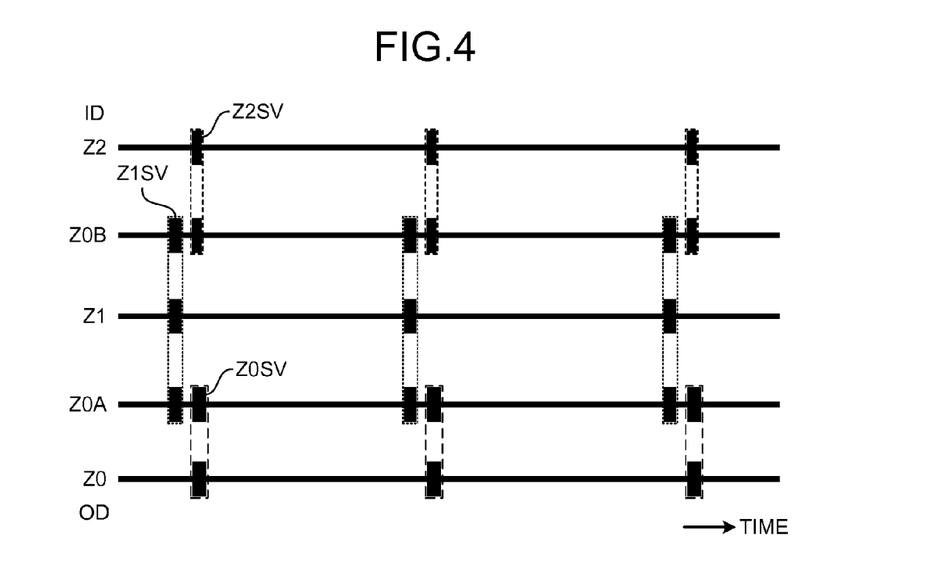
FIG. 4 is a diagram illustrating playback timings for servo playback signals at the magnetic disk device illustrated in FIG. 1.

FIG. 4 is a diagram illustrating playback timings for servo playback signals at the magnetic disk device illustrated in FIG. 1.

Referring to FIG. 4, the zones Z0 to Z2 are assigned from an outer peripheral end OD to an inner peripheral end ID. In this example, a servo playback signal Z0SV in the zone Z0 is played back also at the zone boundary Z0A, a servo playback signal Z1SV in the zone Z1 is played back also at the zone boundaries Z0A and Z0B, and a servo playback signal Z2SV in the zone Z2 is played back also at the zone boundary Z0B.

For assurance of servo quality, servos PBI in the zones Z0 to Z2 are designed to be almost uniform. Thus, the physical servo lengths are almost the same in the zones Z0 to Z2. Meanwhile, the servo playback signals Z0SV to Z2SV are configured in such a manner that the zone Z0 is smaller in pattern length than the zone Z2 and thus is wider in the section of the data area due to a difference in linear velocity of the magnetic head H0 passing over the disk surface M0.

It can be seen that two servo patterns are coexistent at the zone boundaries Z0A and Z0B. At the time of switching among the zones Z0 to Z2, a servo clock for playback of servo data is switched and a window for detection of servo data (also called servo gate) is changed to an appropriate pattern position.

Figure 5:
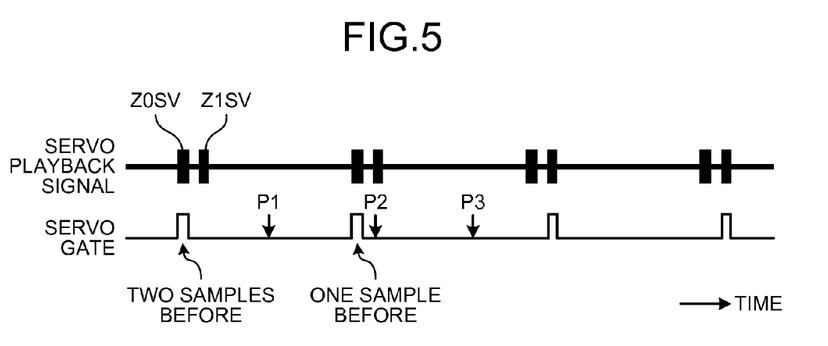
FIG. 5 is a diagram of a sequence of operation performed by a zone boundary crossing processing unit illustrated in FIG. 1.

FIG. 5 is a diagram of a sequence of operation performed by the zone boundary crossing processing unit illustrated in FIG. 1. In the example of FIG. 5, switching takes place from the zone Z0 to the zone Z1. In addition, in the example of FIG. 5, a zone boundary crossing process is started two samples before the zone switching.

Referring to FIG. 5, when a servo gate is turned on, servo data is played back. Upon acquisition of the servo data, the hard disk control unit 9 generates a servo interrupt to execute a seek control process in the current servo frame.

During the seek control process, when determining that a zone boundary crossing process is necessary, the zone boundary crossing processing unit 9A makes a servo gate generation timing temporary change request (hereinafter, referred to as temporary change request) (P1). The temporary change request is intended to request for change of a servo gate generation timing.

However, since the hard disk control unit 9 has already executed timing management for the next servo gate, the temporary change request is put on hold. Then, when a SAM (servo address mark) has been detected at the next servo gate, the temporary change request is accepted.

Next, when the servo process is started in this servo frame, a servo clock switch request is made to the read/write channel 8 (P2). The servo clock switch request is intended to request for change of the frequency of the servo clock. Upon receipt of the switch request, the read/write channel 8 switches from the servo clock for playback of the servo signal in the zone Z0 to the servo clock for playback of the servo signal in the zone Z1.

At that time, the hard disk control unit 9 manages the servo gate generation timing by performing a clock count process with reference to the servo clock generated by the read/write channel 8. Specifically, upon receipt of the SAM detection signal from the read/write channel 8, the hard disk control unit 9 clears the current count value and resumes counting on the servo clock. Then, when the count-up value of the servo clock has reached the count value at the time of servo gate generation, the hard disk control unit 9 turns on the servo gate.

That is, the servo clocks before and after the P2 are different from each other. Accordingly, it is possible to arrange the servo gates as appropriate on the servo generation signals in the zone Z1 by making the original count value at the time of servo gate generation for the zone Z1 different from the count value at the time of servo gate generation according to the temporary change request set at the P1.

Next, a servo gate generation timing management information change request (hereinafter, referred to as management information change request) is made (P3). The management information change request is intended to request change of management information for servo gate generation timing. At that time, a temporary count value at the time of crossing the boundary with a mixture of two servo clocks is changed to the original count value at the time of servo gate generation for the zone Z1.

The management information change request is put on hold as well as the temporary change request, and is accepted when the SAM is detected in the servo gate section of the zone Z1. Then, the suspended management information change request becomes effective from the servo gate generation timing after the crossing the boundary.

As described above, according to the zone servo method, the zone boundary crossing process is issued at the time of crossing the zone boundaries Z0A and Z0B, and the magnetic head seeks with continuous acquisition of servo data in each of the servo frames.

Figure 6:
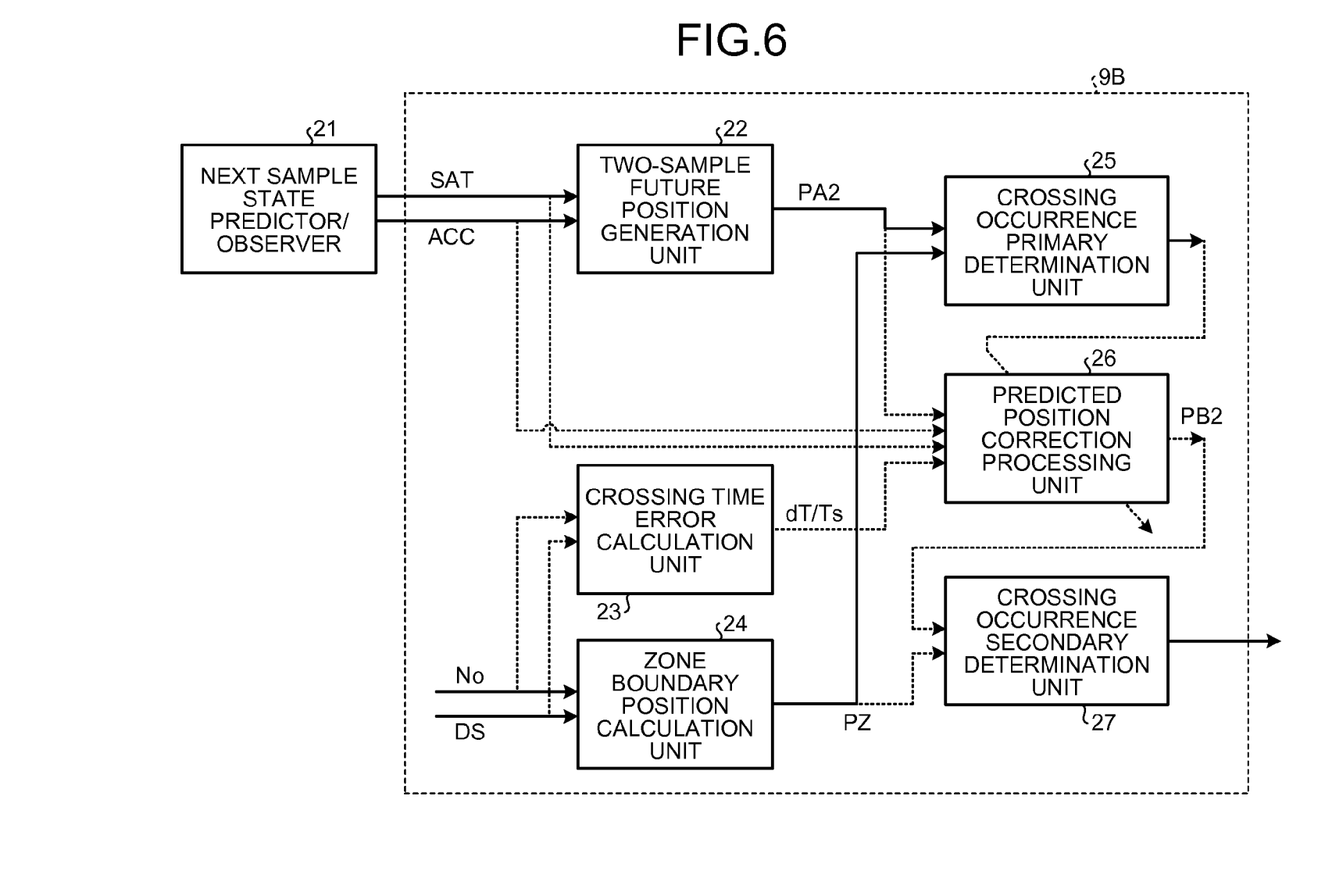
FIG. 6 is a schematic block diagram of a zone boundary crossing determination unit illustrated in FIG. 1.

FIG. 6 is a schematic block diagram of the zone boundary crossing determination unit illustrated in FIG. 1.

Referring to FIG. 6, the crossing determination unit 9B calculates a predicted position PA2 two samples after, and makes a primary determination on whether the predicted position PA2 will cross a zone boundary position PZ. When determining that the predicted position PA2 will cross the boundary position PZ, the crossing determination unit 9B corrects the predicted position PA2 to a predicted position PB2 on the assumption that the zone crossing process has been executed. Then, the crossing determination unit 9B makes a secondary determination on whether the predicted position PB2 will cross the zone boundary position PZ. The crossing determination unit 9B includes a two-sample future position generation unit 22, a crossing time error calculation unit 23, a zone boundary position calculation unit 24, a crossing occurrence primary determination unit 25, a predicted position correction processing unit 26, and a crossing occurrence secondary determination unit 27.

The two-sample future position generation unit 22 calculates the predicted position PA2 according to an estimated motional state SAT and a current sample acceleration ACC. The crossing time error calculation unit 23 calculates the phase shift time dT according to a seek direction DS and a current servo pattern number No, and outputs a value dT/Ts obtained by dividing the phase shift time dT by a servo cycle Ts. The zone boundary position calculation unit 24 calculates the zone boundary position PZ according to the seek direction DS and the current servo pattern number No. The crossing occurrence primary determination unit 25 determines whether the predicted position PA2 will cross the zone boundary position PZ. The predicted position correction processing unit 26 calculates the predicted position PB2 by correcting the predicted position PA2 having been determined to cross the zone boundary position PZ with reference to the phase shift time dT. The crossing occurrence secondary determination unit 27 determines whether the predicted position PB2 will cross the zone boundary position PZ.

Specifically, a next sample state predictor/observer 21 calculates the estimated motional state SAT and the current sample acceleration ACC. The estimated motional state SAT may include a next sample estimated position Pobs and a next sample estimated velocity Vobs. In addition, the two-sample future position generation unit 22 calculates the predicted position PA2 according to the estimated motional state SAT and the current sample acceleration ACC, and outputs the same to the crossing occurrence primary determination unit 25. At that time, the predicted position PA2 two samples after can be expressed by equation (2) as follows:

$$PA2 = Pobs + dP\_VEL + dP\_ACC \quad (2)$$

where dP_VEL is equal to Vobs*Ts, which represents a positional increase one sample after at the current estimated velocity, Ts represents a servo cycle equivalent to one sample time, and dP_ACC is equal to ½*Acc*Ts², which represents a positional increase one sample after at the current estimated acceleration at which the head has been accelerated with a current VCM bias estimated amount and a current sample VCM output. The VCM output from the next sample, although cannot be settled at this point of time, may be regarded as the same as that from the current sample to calculate the predicted position PA2 two samples after. When being converted into physical information, the equation (2) is equivalent to equation (3) as follows:

$$PA2 = Pobs + Vobs*Ts + \tfrac{1}{2}*Acc*Ts^2 \quad (3)$$

FIG. 6 describes a method for the next sample state predictor/observer 21 to calculate the estimated motional state SAT and the current sample acceleration ACC. Alternatively, the next sample state predictor/observer 21 may calculate dP_VEL and dP_ACC.

In addition, the zone boundary position PZ calculated by the zone boundary position calculation unit 24 is output to the crossing occurrence primary determination unit 25.

Then, the crossing occurrence primary determination unit 25 compares the predicted position PA2 with the zone boundary position PZ to determine whether the predicted position PA2 will cross the zone boundary position PZ. Then, when determining that the predicted position PA2 will cross the zone boundary position PZ, the crossing occurrence primary determination unit 25 outputs the determination result to the predicted position correction processing unit 26.

The crossing time error calculation unit 23 derives the phase shift time dT with reference to the table from the seek direction DS and the current servo pattern number No, and outputs the value dT/Ts to the predicted position correction processing unit 26.

Then, the predicted position correction processing unit 26 corrects the shift of dT/Ts in the predicted position resulting from the phase shift, and outputs the corrected result to the crossing occurrence secondary determination unit 27. At that time, the predicted position PB2 obtained by correcting the predicted position PA2 can be expressed by equation (4) as follows:

$$PB2 = PA2 + dP\_VEL*k + dP\_ACC*(2*k+k^2) \quad (4)$$

where k represents the correction coefficient of dT/Ts ratio.

When being converted into physical information, the equation (4) is equivalent to equation (5) as follows:

$$\begin{aligned}PB2 &= Pobs + dP\_VEL*(1+k) + dP\_ACC*(1+2*k+k^2)\\ &= Pobs + Vobs*(Ts+dT) + \tfrac{1}{2}*Acc*(Ts+dT)^2\end{aligned} \quad (5)$$

Then, the crossing occurrence secondary determination unit 27 makes a final determination on whether the predicted position PB2 will cross the zone boundary position PZ. Specifically, when it is not determined that the predicted position PA2 two samples after will cross the zone boundary position PZ, the primary determination result becomes the final determination result. When it is determined that the predicted position PA2 two samples after will cross the zone boundary position PZ, the crossing occurrence secondary determination unit 27 makes the final determination on whether the predicted position PB2 two samples after with reference to the phase shift time dT will cross the zone boundary position PZ.

By determining whether the predicted position PB2 two samples after with reference to the phase shift time dT will cross the zone boundary position PZ, it is possible to remove the error caused by the velocity-dependent phase shift from the predicted position PB2. At that time, the error in the predicted position PB2 can fall within the range of predicted error of the next sample state predictor/observer 21.

That is, the lower limit for the width Wzs of the void region can be expressed by equation (6) as follows:

$$Wzs \geq 2*P2err \quad (6)$$

where P2err represents a parameter variable depending on adjustment to the next sample state predictor/observer 21, and can be controlled to a negligible state (several tracks or less) by making a strict adjustment to the next sample state predictor/observer 21. For example, when it is assumed that the maximum error of the next sample state predictor/observer 21 is 10 tracks or less, 350 kTPI, the error of the predicted position PB2 can fall under 0.668 μm or less.

Accordingly, the lower limit for the width Wzs of the void region may be given by the MR offset MRf. To write the data track closest to the zone boundary and play back the same, it is essential to set the offset region between the MR offset widths in such a manner that the same servo pattern side as that at the time of writing can be selected. This is because, even though the estimated error of the next sample state predictor/observer 21 can be controlled in a negligible state, a minimum of a duplicated servo region for the MR offset width is required.

Figure 7:
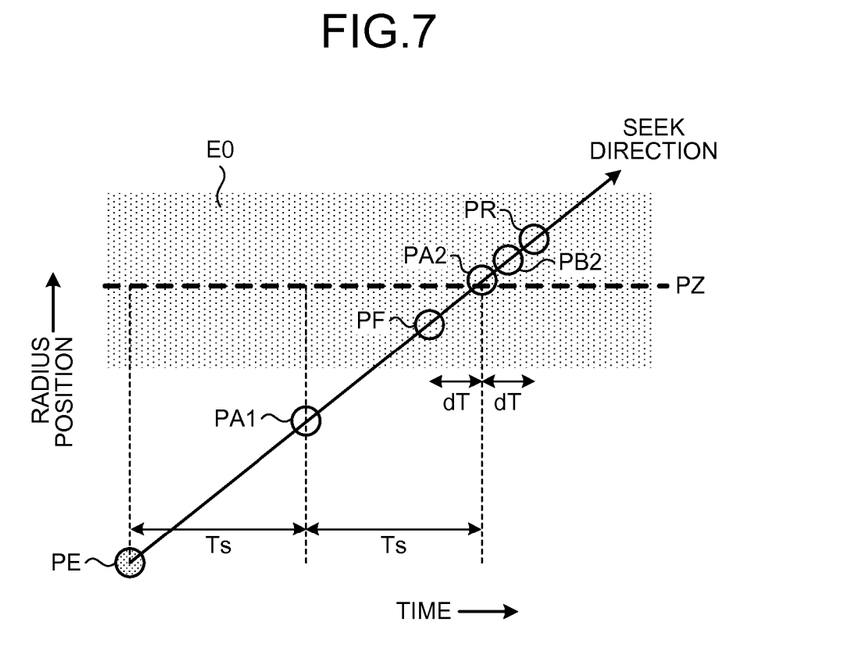
FIG. 7 is a diagram illustrating a correcting method of a predicted position two samples after according to the first embodiment.

FIG. 7 is a diagram illustrating a correcting method of a predicted position two samples after according to the first embodiment.

Referring to FIG. 7, the predicted position one sample after from the current position PE is at PA1, and the predicted position two samples after from the current position PE is at PA2. In addition, a lagging-side servo pattern position PR is the phase shift time dT behind the zone boundary position PZ, and a leading-side servo pattern position PF is the phase shift time dT ahead of the zone boundary position PZ. When it is determined that the predicted position PA2 will cross the zone boundary position PZ, it is finally determined whether the predicted position PB2 two samples after with reference to the phase shift time dT will cross the zone boundary position PZ.

At that time, a position error Ep in the predicted position PA2 resulting from the phase shift time dT depends on the seek motion velocity. When the seek velocity is designated as V, the position error Ep can be expressed by equation (7) as follows:

$$Ep = v \cdot dT \quad (7)$$

That is, the range of the position error Ep in the predicted position PA2 two samples after can be expressed by equation (8) as follows:

$$-|V\max \cdot dT| \le Ep \le +|V\max \cdot dT| \quad (8)$$

where Vmax represents the seek maximum velocity.

If the seek maximum velocity Vmax is 3 m/s and the phase shift time dT is +2.2 ρs, there arises a position error of 0 to 6.6 μm (about 90 tracks based on the assumption of 350 kTPI). This error is much larger than the predicted error two samples after caused by the next sample state predictor/observer 21.

That is, unless servo patterns are existent at the both sides, it is difficult to acquire the servo data in the servo frame after the switching. When it is to be determined whether the predicted position PA2 two samples after will cross the zone boundary position PZ, it is necessary to set the width Wzs to 13.2 μm or more, otherwise the servo detection may fail when the magnetic head crosses the boundary at a seek velocity close to the maximum velocity. Specifically, when it is to be determined whether the predicted position PA2 two samples after will cross the zone boundary position PZ, it is necessary to set Wzs to satisfy the condition in equation (9) as follows:

$$Wzs \ge 2(V\max \cdot dT + P2err) \quad (9)$$

Even if Wzs is set to the minimum to satisfy the condition in equation (9), the three-zone servo patterns are existent at two positions, which causes a loss of total 360 tracks based on the assumption of a data track of 350 kTPI.

In contrast, by making a final determination on whether the predicted position PB2 two samples after with reference to the phase shift time dT will cross the zone boundary position PZ, it is possible to set Wzs to satisfy the condition in equation (1) and thus reduce Wzs.

Figure 8:
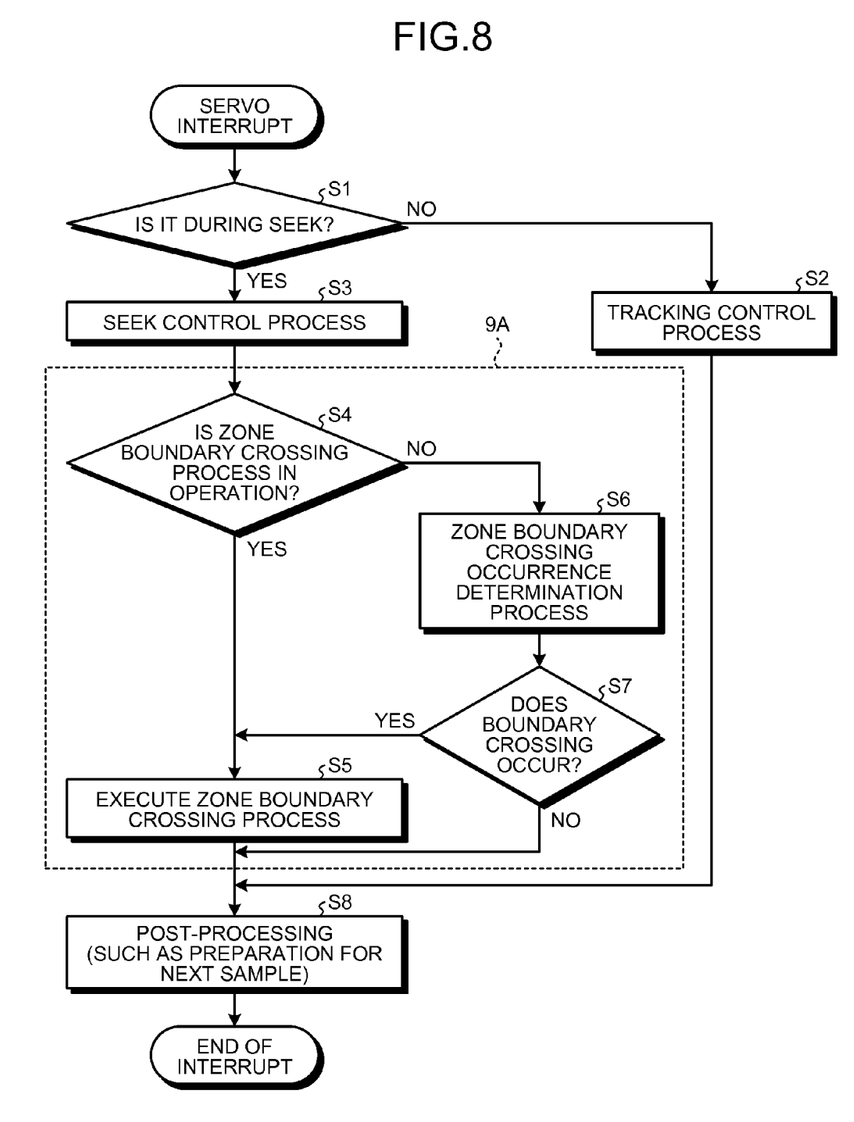
FIG. 8 is a flowchart of a servo interrupt process according to the first embodiment.

FIG. 8 is a flowchart of a servo interrupt process according to the first embodiment.

Referring to FIG. 8, the hard disk control unit 9 determines whether the magnetic head is under a seek (S1). When the magnetic head is not under a seek (S1: No), the tracking control process is performed (S2), and then the process is moved to post-processing such as preparation for the next sample (S8). Meanwhile, when the magnetic head is under a seek (S1: Yes), the seek control process is performed (S3). When the seek control process is performed, it is determined whether the zone boundary crossing processing unit 9A is under the zone boundary crossing process (S4). When the zone boundary crossing processing unit 9A is under the zone boundary crossing process (S4: Yes), the zone boundary crossing process is performed (S5), and the process is moved to post-processing such as preparation for the next sample (S8). In the zone boundary crossing process, as illustrated in FIG. 5, the process of P1 is first executed, and then the processes of P2 and P3 are executed in the next sample. After that, when it is confirmed that the zone boundary crossing has succeeded, the zone boundary crossing process is cancelled and the next zone boundary crossing occurrence determination process is started again. Meanwhile, when the zone boundary crossing processing unit 9A is not under the zone boundary crossing process (S4: No), the crossing determination unit 9B performs the zone boundary crossing determination process (S6). In the zone boundary crossing determination process, it is ascertained whether zone boundary crossing occurs two samples after for each of the samples. When the zone boundary crossing determination process is performed, it is determined whether zone boundary crossing has occurred (S7). When zone boundary crossing has occurred (S7: Yes), the zone boundary crossing process is performed (S5). Meanwhile, when no zone boundary crossing has occurred (S7: No), the process is moved to post-processing such as preparation for the next sample (S8).

Figure 9:
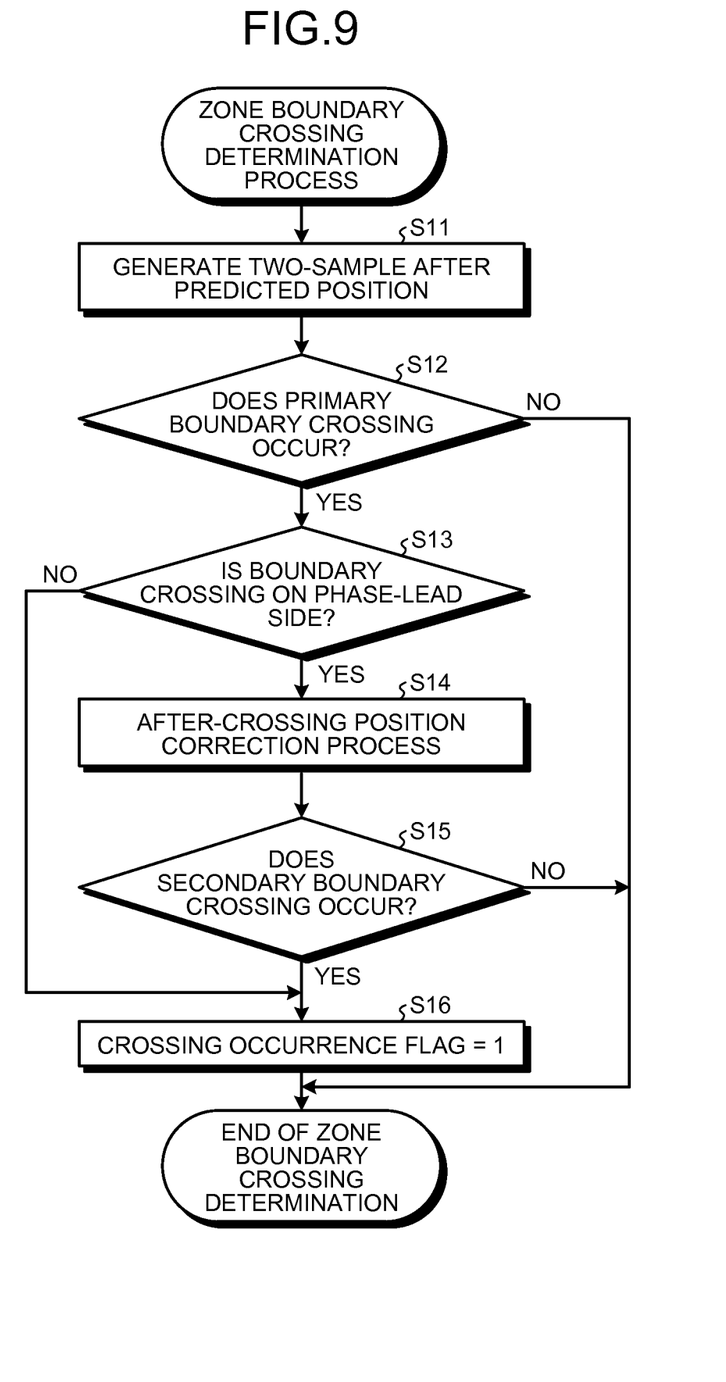
FIG. 9 is a flowchart of a zone boundary crossing determination process according to the first embodiment.

FIG. 9 is a flowchart of the zone boundary crossing determination process according to the first embodiment.

Referring to FIG. 9, the two-sample future position generation unit 22 calculates a predicted position two samples after (S11). Next, the crossing occurrence primary determination unit 25 makes a primary determination on zone boundary crossing according to the predicted position (S12). When no zone boundary crossing will occur (S12: No), the zone boundary crossing determination process is terminated. Meanwhile, when zone boundary crossing will occur (S12: Yes), it is determined whether the predicted position will cross a phase-lead servo pattern (S13). When the predicted position will cross a phase-lag servo pattern (S13: No), the result of the secondary crossing determination is surely in the affirmative. Accordingly, when the predicted position will cross the phase-lag servo pattern, the secondary crossing determination is omitted and the crossing flag is set to 1 for prevention of waste calculation (S16). Meanwhile, when the predicted position will cross the phase-lead servo pattern (S13: Yes), the predicted position correction processing unit 26 corrects the predicted position (S14). Next, the crossing occurrence secondary determination unit 27 makes a secondary determination on whether the corrected predicted position will cross the zone boundary position (S15). When no zone boundary crossing will occur (S15: No), the zone boundary crossing determination process is terminated. Meanwhile, when zone boundary crossing will occur (S15: Yes), the crossing flag is set to 1 (S16).

Second Embodiment

Figure 10:
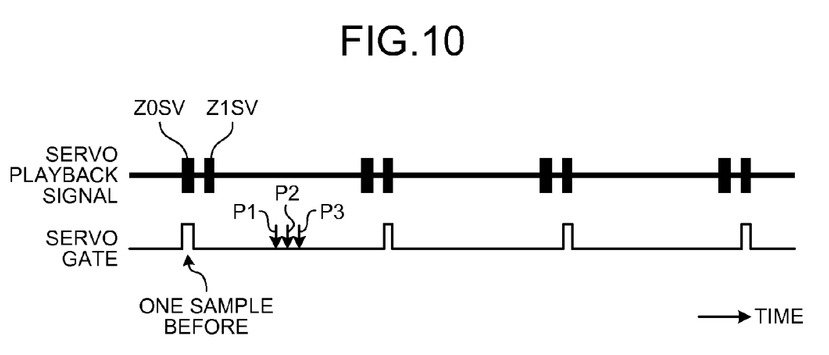
FIG. 10 is a diagram of a sequence of operation performed by a zone boundary crossing processing unit applied to a magnetic disk device according to a second embodiment.

FIG. 10 is a diagram of a sequence of operation performed by a zone boundary crossing processing unit applied to a magnetic disk device according to a second embodiment. In the example of FIG. 10, switching takes place from the zone Z0 to the zone Z1. In addition, in the example of FIG. 10, the zone boundary crossing process is started one sample before zone switching.

Referring to FIG. 10, when a servo gate is turned on, servo data is played back. When acquiring the servo data, the hard disk control unit 9 performs a servo interrupt process and executes a seek control process in the current servo frame.

When determining that a zone boundary crossing process is necessary during the seek control process, the hard disk control unit 9 makes a temporary change request (P1). Next, when the servo process is started in this servo frame, the hard disk control unit 9 switches the servo clock (P2) and makes a management information change request (P3). At that time, the hard disk control unit 9 can perform timing control at the servo gate according to count management on a steady clock.

Figure 11:
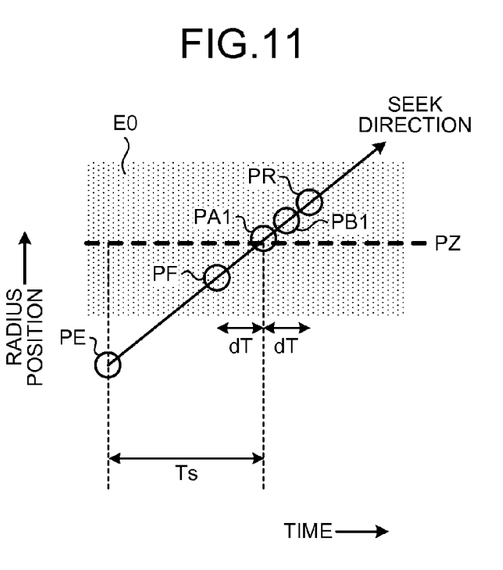
FIG. 11 is a diagram illustrating a correcting method of a predicted position one sample after according to the second embodiment.

FIG. 11 is a diagram illustrating a correcting method of a predicted position one sample after according to the second embodiment.

Referring to FIG. 11, a predicted position one sample after the current position PE is at PA1. In addition, a lagging-side servo pattern position PR is the phase shift time dT behind the zone boundary position PZ, and a leading-side servo pattern position PF is the phase shift time dT ahead of the zone boundary position PZ. Then, when it is determined that the predicted position PA1 will cross the zone boundary position PZ, it is finally determined whether the predicted position PB1 one sample after with reference to the phase shift time dT will cross the zone boundary position PZ.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a magnetic disk in which servo patterns with different writing frequencies are recorded and divided into a plurality of zones in a cross-track direction;
   a magnetic head that is provided for the magnetic disk; and
   a controller to determine whether the magnetic head cross a zone boundary between the zones of the servo patterns, according to a predicted position of the magnetic head that is corrected with reference to a phase shift time between the zones of the servo patterns, wherein the controller corrects the predicted position in such a manner that the servo patterns are detected immediately after the magnetic head crosses the zone boundary.

2. A magnetic disk device, comprising:
   a magnetic disk in which servo patterns with different writing frequencies are recorded and divided into a plurality of zones in a cross-track direction;
   a magnetic head that is provided for the magnetic disk; and
   a controller to determine whether the magnetic head cross a zone boundary between the zones of the servo patterns, according to a predicted position of the magnetic head that is corrected with reference to a phase shift time between the zones of the servo patterns, wherein the controller comprises:
   a primary determination unit to determine whether the magnetic head cross the zone boundary, according to a primary predicted position calculated based on current acceleration of the magnetic head; and
   a secondary determination unit to determine whether the magnetic head cross the zone boundary, according to a secondary predicted position obtained by correcting the primary predicted position at which it is determined that the magnetic head cross the zone boundary, with reference to phase shift time.

3. The magnetic disk device of claim 2, wherein the secondary determination unit corrects the primary predicted position when the magnetic head cross the zone boundary in a phase-lead servo pattern, or does not correct the primary predicted position when the magnetic head cross the zone boundary in a phase-delay servo pattern.

4. The magnetic disk device of claim 2, the controller further comprises: an error calculation unit to calculate the phase shift time according to a seek direction and a current servo pattern number.

5. The magnetic disk device of claim 2, wherein the primary predicted position is a predicted position one sample after.

6. The magnetic disk device of claim 5, wherein a first request for requesting change of a servo gate generation timing, a second request for requesting change of a servo clock frequency, and a third request for requesting change of management information for servo gate generation timing, are executed in a process one sample before.

7. The magnetic disk device of claim 2, wherein the primary predicted position is a predicted position two samples after.

8. The magnetic disk device of claim 7, wherein the first request for requesting change of a servo gate generation timing is executed in a process two samples before, and the second request for requesting change of a servo clock frequency and the third request for requesting change of management information for servo gate generation timing are executed in a process one sample before.

9. A magnetic disk device, comprising:
   a magnetic disk in which servo patterns with different writing frequencies are recorded and divided into a plurality of zones in a cross-track direction and a region not be accessible as a data area is provided along a zone boundary; and
   a magnetic head that is provided for the magnetic disk, wherein
   when width of the region is designated as Wzs, maximum velocity of the magnetic head at seek time as maxVel, and phase shift time between the zones of the servo patterns as dT, the condition Wzs<maxVel×dT is satisfied.

10. A determining method of crossing a zone boundary, comprising:
   correcting a predicted position of a magnetic head with reference to a phase shift time between zones of servo patterns that are divided into a plurality of zones and are recorded with different writing frequencies on a magnetic disk in a cross-track direction; and
   determining whether the magnetic head cross a zone boundary between the zones according to corrected result of the predicted position, wherein
   the magnetic disk comprises a region not be accessible as a data area along the zone boundary, and
   when width of the region is designated as Wzs, maximum velocity of the magnetic head at seek time as maxVel, and phase shift time between the zones of the servo patterns as dT, the condition Wzs<maxVel×dT is satisfied.

11. The determining method of claim 10, further comprising: correcting the predicted position in such a manner that the servo patterns are detected immediately after the magnetic head crosses the zone boundary.

12. The determining method of claim 10, further comprising:

determining whether the magnetic head cross the zone boundary, according to a primary predicted position calculated based on current acceleration of the magnetic head; and determining whether the magnetic head cross the zone boundary, according to a secondary predicted position obtained by correcting the primary predicted position at which it is determined that the magnetic head cross the zone boundary with reference to phase shift time.

13. The determining method of claim 12, further comprising: correcting the primary predicted position when the magnetic head cross the zone boundary in a phase-lead servo pattern, or not correcting the primary predicted position when the magnetic head cross the zone boundary in a phase-delay servo pattern.

14. The determining method of claim 12, further comprising: calculating the phase shift time according to a seek direction and a current servo pattern number.

15. The determining method of claim 12, wherein the primary predicted position is a predicted position one sample after.

16. The determining method of claim 15, further comprising: executing a first request for requesting change of a servo gate generation timing, a second request for requesting change of a servo clock frequency, and a third request for requesting change of management information for servo gate generation timing, in a process one sample before.

17. The determining method of claim 12, wherein the primary predicted position is a predicted position two samples after.

18. The determining method of claim 17, further comprising: executing the first request for requesting change of a servo gate generation timing in a process two samples before, and executing the second request for requesting change of a servo clock frequency and the third request for requesting change of management information for servo gate generation timing in a process one sample before.

* * * * *